United States Patent [19]

Doonan

[11] 4,137,680
[45] Feb. 6, 1979

[54] HOLE PLUG FOR INSULATED INJECTION WALL HOLES

[76] Inventor: R. Dean Doonan, 101 Sunnyside Dr., Montezuma, Iowa 50171

[21] Appl. No.: 804,545

[22] Filed: Jun. 8, 1977

[51] Int. Cl.² .......................................... E02D 35/00
[52] U.S. Cl. ........................................ 52/127; 52/302
[58] Field of Search ............... 52/302, 303, 304, 305, 52/404, 743, 127; 220/307, 352, DIG.19; 215/317, 355, 358; 138/890, 96 R; 85/80, 5

[56] References Cited

U.S. PATENT DOCUMENTS

| | | | |
|---|---|---|---|
| 2,196,785 | 4/1940 | Takiguchi | 138/96 R |
| 2,746,632 | 5/1956 | Bramming | 215/358 X |
| 3,233,502 | 2/1966 | Fernberg | 85/80 |
| 3,338,447 | 8/1967 | Meyers | 215/358 |
| 3,619,437 | 11/1971 | McDonald, Jr. | 52/745 X |
| 3,893,275 | 7/1975 | Omholt | 52/743 X |

FOREIGN PATENT DOCUMENTS

645293  10/1950  United Kingdom ................. 215/358

Primary Examiner—Ernest R. Purser
Assistant Examiner—Carl D. Friedman
Attorney, Agent, or Firm—Zarley, McKee, Thomte, Voorhees & Sease

[57] ABSTRACT

An exterior building wall includes insulation injection holes filled by hole plugs. The hole plugs each include a disc-shaped circular outwardly convex head. Arcuate in transverse cross-section legs are radially inwardly offset from the outer peripheral edge of the head. The legs include a series of longitudinally outwardly tapering shoulders which form wall gripping and sealing teeth.

8 Claims, 6 Drawing Figures

HOLE PLUG FOR INSULATED INJECTION WALL HOLES

BACKGROUND OF THE INVENTION

Building walls may be insulated by injecting plastic foam into them through injection holes uniformly spaced over the wall. Upon completion of the injection foaming process, the injection holes need to be closed in a manner that is esthetically pleasing. Accordingly, a wall plug is desired that will be retained in the injection hole, be inexpensive to produce, and attractive in appearance by blending into the wall surface. If desired, the wall plugs should be of a material that may be painted over when the entire wall surface is being painted.

SUMMARY OF THE INVENTION

The wall plug of this invention includes a circular disc-shaped head having a convex outer surface which provides an annular flange which blends into the wall in which the plug is mounted. The outer head surface may be painted over to further blend the hole plug into the wall surface. The plug is held in place by a plurality of arcuate in transverse cross-section legs which include a series of annular shoulders tapering longitudinally outwardly to provide gripping and sealing teeth for engagement with the hole surface in the wall, thereby sealing the plug in the wall and locking it permanently in place. The plug may be easily and quickly inserted into the injection hole in the wall after the foam material has been injected into the wall.

DESCRIPTION OF THE PREFERRED EMBODIMENT

Figure 1:
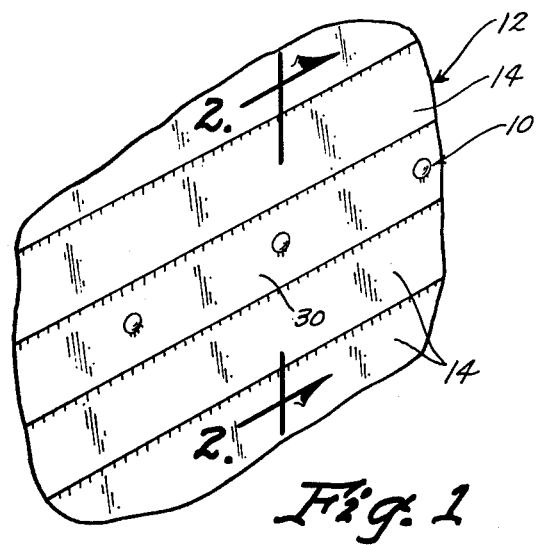
FIG. 1 is a fragmentary perspective view of a building wall having injection holes closed by the hole plug of this invention.

The hole plug of this invention is referred to generally in FIG. 1 by the reference numeral 10, and is shown mounted in a building wall 12 having siding material 14 over sheathing 16. Injected insulation foam material 18 is held between the sheeting 16 and an inside wall board 20.

Figure 2:
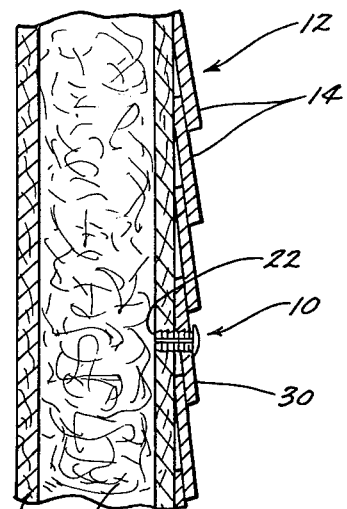
FIG. 2 is a cross-sectional view taken along line 2—2 of FIG. 1.

The hole plug 10 closes an injection hole 22 extending through the siding 14 and the sheathing 16 as seen in FIG. 2. The plug includes a circular disc-shaped head 24 having a convex outer surface 26 which tapers to an annular sharp edge 28 which blends into the wall surface 30 as seen in FIGS. 1 and 2. A plurality of arcuate in transverse cross section legs 34 depend from the bottom flat surface 36 of the head 24 and are radially inwardly offset from the outer peripheral edge 28 thereby defining a flange 38.

Figures 3, 4:
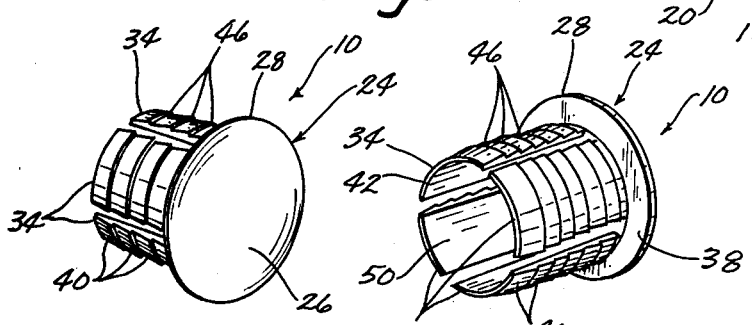
FIG. 3 is a perspective view of the head end of the hole plug.
FIG. 4 is a perspective view of the bottom end of the hole plug.
Figure 5:
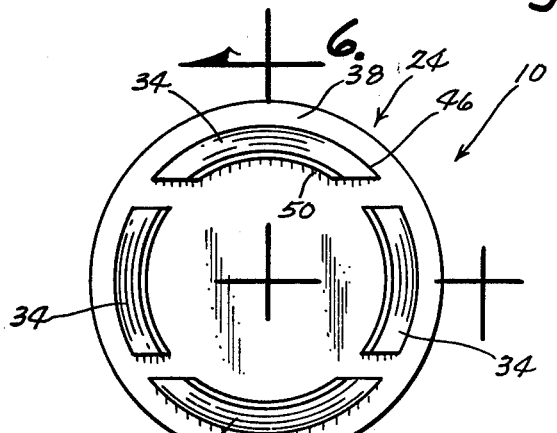
FIG. 5 is a bottom plan view thereof.
Figure 6:
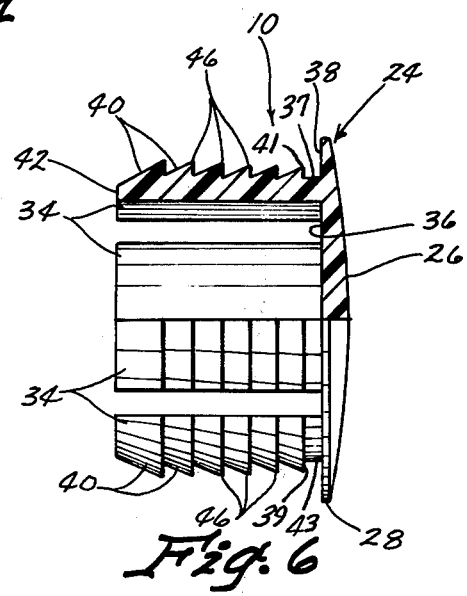
FIG. 6 is a cross-sectional view taken along line 6—6 in FIG. 5.

Each of the legs 34 include annular longitudinally outwardly tapering shoulders 40 arranged in series from the head 24 to the outer or bottom tapered edge 42 which allows for penetration into the wall hole 22. A series of annular shoulders 40 form gripping and sealing teeth 46 which engage the inner surface of the hole 22. Between flange 38 and flat surface 39 of the adjacent shoulder 41 is an annular space 43. Annular space 43 is thereby bounded by flange 38, parallel flat surface 39 and cylindrical surface 37. The inner surface of the legs 34 is cylindrical and indicated at 50 in FIG. 4. The outer shape of the plug as defined by the outer edges of the teeth 46 is also cylindrical and parallel to the inner cylindrical surface 50 as perhaps best seen in FIG. 5.

It is seen that the hole plug 10 of this invention may be readily inserted into the wall hole 22 after the wall has been filled with insulation 18 and may then be painted over to blend into the exterior wall surface and be substantially obscured from sight. The plug may be made of suitable plastic material such as ABS Plastic.

What is claimed is:

1. A hole plug for insulation injection holes in building walls comprising,
   a circular disc shaped head having a plurality of peripherally disposed transverse arcuate legs, radially inwardly offset from the outer edge of said head thereby forming a flange having a flat bottom surface and said head having a slightly convex outer surface to blend into a wall surface, said legs having adjacent straight longitudinal edges in spaced relation and including exterior surfaces having a series of annular shoulders tapered longitudinally away from said head thereby forming gripping teeth, said flange and the flat surface of said annular shoulder adjacent said flange forming an annular space therebetween and said flat bottom surface of said flange being parallel to said flat surface of said adjacent annular shoulder and the bottom surface of said annular space being perpendicular to said flat bottom surface of said flange and said flat surface of said adjacent annular shoulder.

2. The structure of claim 1 wherein said circular disc-shaped head is tapered to the peripheral edge thereof.

3. The structure of claim 2 wherein said plug is formed from plastic material.

4. The structure of claim 1 wherein the outermost annular edges of said shoulders lie in a common circular plane.

5. The structure of claim 4 wherein the outermost annular shoulders are tapered to an annular sharp edge to facilitate penetration into a wall.

6. The structure of claim 1 wherein said legs include inner surfaces which cooperate to define a cylinder having an open outer end opposite said head.

7. The structure of claim 1 wherein said legs are perpendicular to said flat bottom surface of said flange.

8. The structure of claim 1 wherein a substantial number of the outermost annular edges of said shoulders lie in a common circular plane.

* * * * *